US012588665B2

(12) United States Patent (10) Patent No.: US 12,588,665 B2
Santana (45) Date of Patent: Mar. 31, 2026

(54) BILLFISH PADLOCK

(71) Applicant: Luis Santana, Vega Baja, PR (US)

(72) Inventor: Luis Santana, Vega Baja, PR (US)

( * ) Notice: Subject to any disclaimer, the term of this patent is extended or adjusted under 35 U.S.C. 154(b) by 0 days.

(21) Appl. No.: 18/679,897

(22) Filed: May 31, 2024

(65) Prior Publication Data

US 2025/0366450 A1 Dec. 4, 2025

(51) Int. Cl.
A01K 83/00 (2006.01)
(52) U.S. Cl.
CPC .................................... A01K 83/00 (2013.01)
(58) Field of Classification Search
CPC ................................ A01K 83/00; A01K 83/06
See application file for complete search history.

(56) References Cited

U.S. PATENT DOCUMENTS

| | | | | |
|---|---|---|---|---|
| 385,913 | A * | 7/1888 | Hunter | A01K 83/06 43/44.8 |
| 620,896 | A * | 3/1899 | Edgar | A01K 83/00 43/43.16 |
| 666,309 | A * | 1/1901 | Fiege | A01K 83/00 43/44.82 |
| 1,249,342 | A * | 12/1917 | Dahl | A01K 83/06 43/44.8 |
| 2,233,863 | A * | 3/1941 | Driscoll | A01K 83/00 43/43.16 |
| 2,808,678 | A | 10/1957 | Leonardi | |
| 4,104,820 | A | 8/1978 | Bardebes | |
| 5,077,931 | A * | 1/1992 | Marshall | A01K 85/02 43/44.8 |
| 6,637,148 | B1 * | 10/2003 | Stallings | A01K 83/06 43/44.8 |
| 7,420,930 | B2 | 9/2008 | Usuba | |
| 7,424,786 | B1 | 9/2008 | Nelson | |
| 9,565,842 | B1 | 2/2017 | Winter | |
| 2002/0032979 | A1 | 3/2002 | Hildman | |
| 2002/0050093 | A1 * | 5/2002 | Bahery | A01K 83/00 43/43.16 |
| 2008/0047192 | A1 * | 2/2008 | Bennis | A01K 83/06 43/44.8 |
| 2008/0066370 | A1 | 3/2008 | Wichern | |
| 2013/0239459 | A1 * | 9/2013 | Rosenberg | A01K 83/06 43/44.2 |

OTHER PUBLICATIONS https://fr.aliexpress.com/item/1005005108082231.html?gatewayAdapt= glo2fra.
https://www.etsy.com/listing/805218871/made-to-order-blue-coat- double-barb?gpla=1&gao=1&&utm_source=google&utm_medium= cpc&utm_campaign=shopping_us_a-toys_and_games-sports_and_ outdoor_games-camping&utm_custom1=_k_ CjwKCAiA1fqrBhA1EiwAMU5m_ 0tIMU5cmuZkkw37R54P2Ah.

* cited by examiner

*Primary Examiner* — Richard G Davis
(74) *Attorney, Agent, or Firm* — Jerome Drabiak; Youngsun Kwon; Edison Law Group

(57) ABSTRACT

The present invention relates to a fishing hook with an innovative design featuring two barbs strategically posi- tioned on the inside of the hook's curve. The dual-barbed fishing hook enhances the retention capability, thereby reducing the likelihood of fish escaping during retrieval. This invention aims to provide anglers with an improved fishing hook design that increases catch efficiency while minimizing harm to the fish.

2 Claims, 1 Drawing Sheet

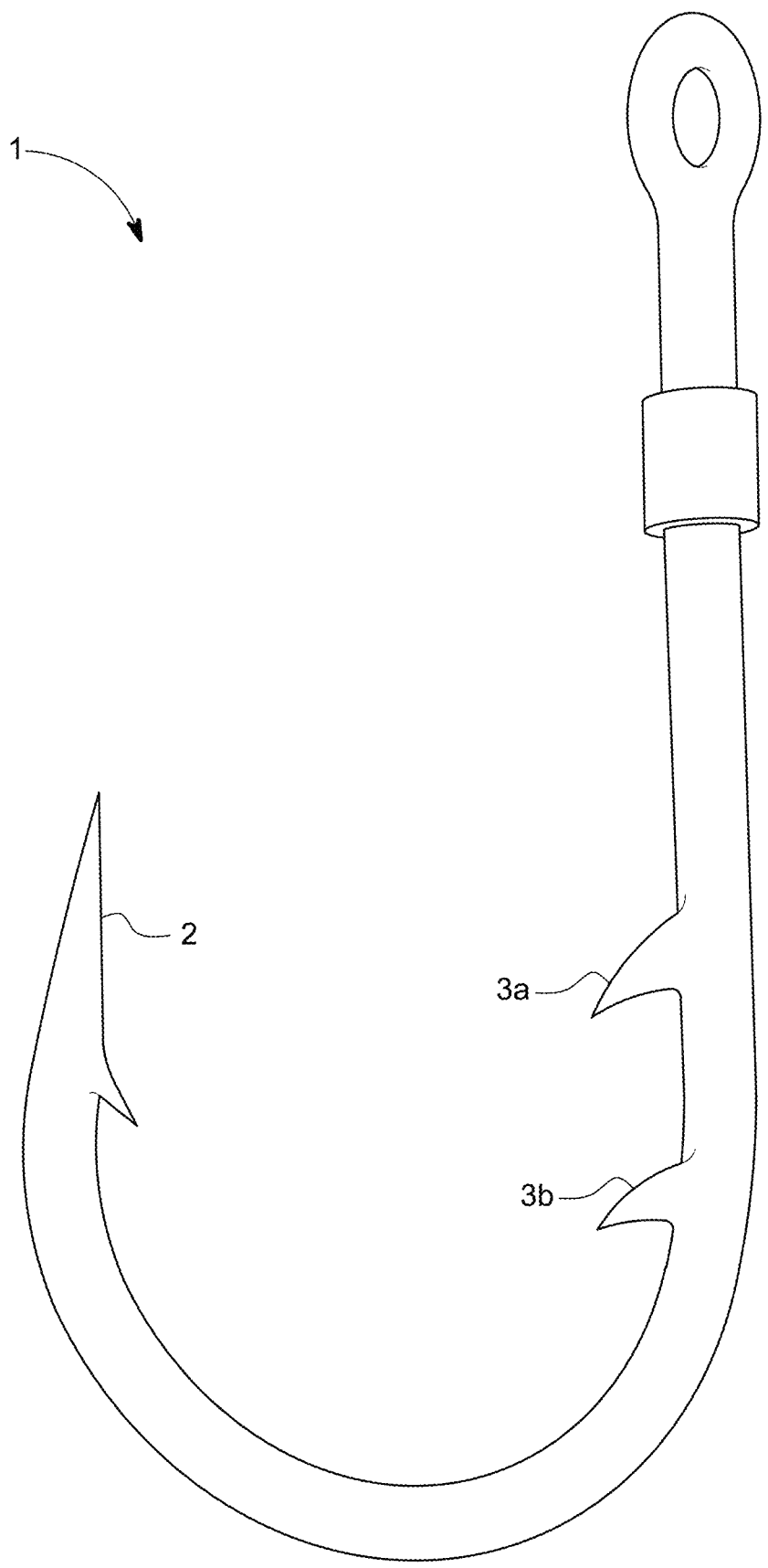

BILLFISH PADLOCK

BACKGROUND OF THE INVENTION

Traditional fishing hooks typically feature a single barb located on the outside of the hook's curve. While effective in securing the catch, these hooks can occasionally result in fish escaping due to the single-point contact with the bait. Furthermore, the external barb design may cause excessive damage to the fish's mouth, affecting its survival upon release.

In response to these limitations, various attempts have been made to improve fishing hook designs. Some designs have focused on increasing the sharpness or size of the barb, while others have explored alternative materials for construction. However, these modifications have often fallen short in addressing the core issues of retention and fish welfare.

On multiple occasions, Marlins introduce their bill through the curve of the hook, and when this happens, they escape.

SUMMARY OF THE INVENTION

This invention prevents this situation by adding two spikes on the inside area of the hook's curve opposing the single (original) spike of the hook. This provides two additional contact areas with the bill facilitating the capture of marlins.

BRIEF DESCRIPTION OF DRAWINGS

FIG. 1 illustrates a dual-barbed fishing hook with two barbs on the inside area of the hook's curve, at the point just opposite of the barb on the end of the hook.

DETAILED DESCRIPTION OF THE INVENTION

The present invention introduces a novel approach by incorporating two barbs on the inner side of the hook's curve. This unique configuration provides several advantages over conventional single-barbed hooks. Firstly, the dual-barbed design significantly enhances the hook's holding power by creating multiple points of contact with the fish's mouth upon penetration. This reduces the likelihood of the fish shaking off the hook during retrieval, thereby increasing catch rates.

Secondly, positioning the barbs on the inside of the hook's curve offers additional protection to the fish's mouth. Unlike external barbs that can cause extensive damage upon penetration, the inner barbs exert less pressure on the fish's tissues, minimizing injury and facilitating safer catch-and-release practices.

Moreover, the dual-barbed fishing hook is versatile and can be adapted to various fishing techniques and bait types. Whether used for freshwater or saltwater fishing, the enhanced retention capability of the hook ensures reliable performance across different fishing environments and target species.

In summary, the dual-barbed fishing hook represents a significant advancement in fishing tackle technology, addressing the need for improved retention efficiency and fish welfare. By combining enhanced holding power with reduced harm to the catch, this invention offers anglers a more effective and ethical approach to fishing.

The invention claimed is:

1. An improvement in a fishhook comprising a shank defining an upwardly disposed barbed end portion, an upwardly disposed apertured end portion located opposite the barbed end portion, and a curved shank portion located therebetween, wherein the improvement comprises:

the shank further defining a pair of spaced-apart downwardly disposed additional barbs oriented toward the barbed end portion, wherein one of the additional barbs is unitary with an external surface portion of the shank and the other one of the additional barbs is unitary with an external surface portion of the curved portion of the shank.

2. The improved fishhook of claim 1, wherein the other one of the additional barbs is located closely adjacent to an uncurved portion of the shank and spaced below said one of the additional barbs.

\* \* \* \* \*